R. L. TAYLOR.
HORSESHOE.
APPLICATION FILED SEPT. 11, 1911.
1,024,426.  Patented Apr. 23, 1912.
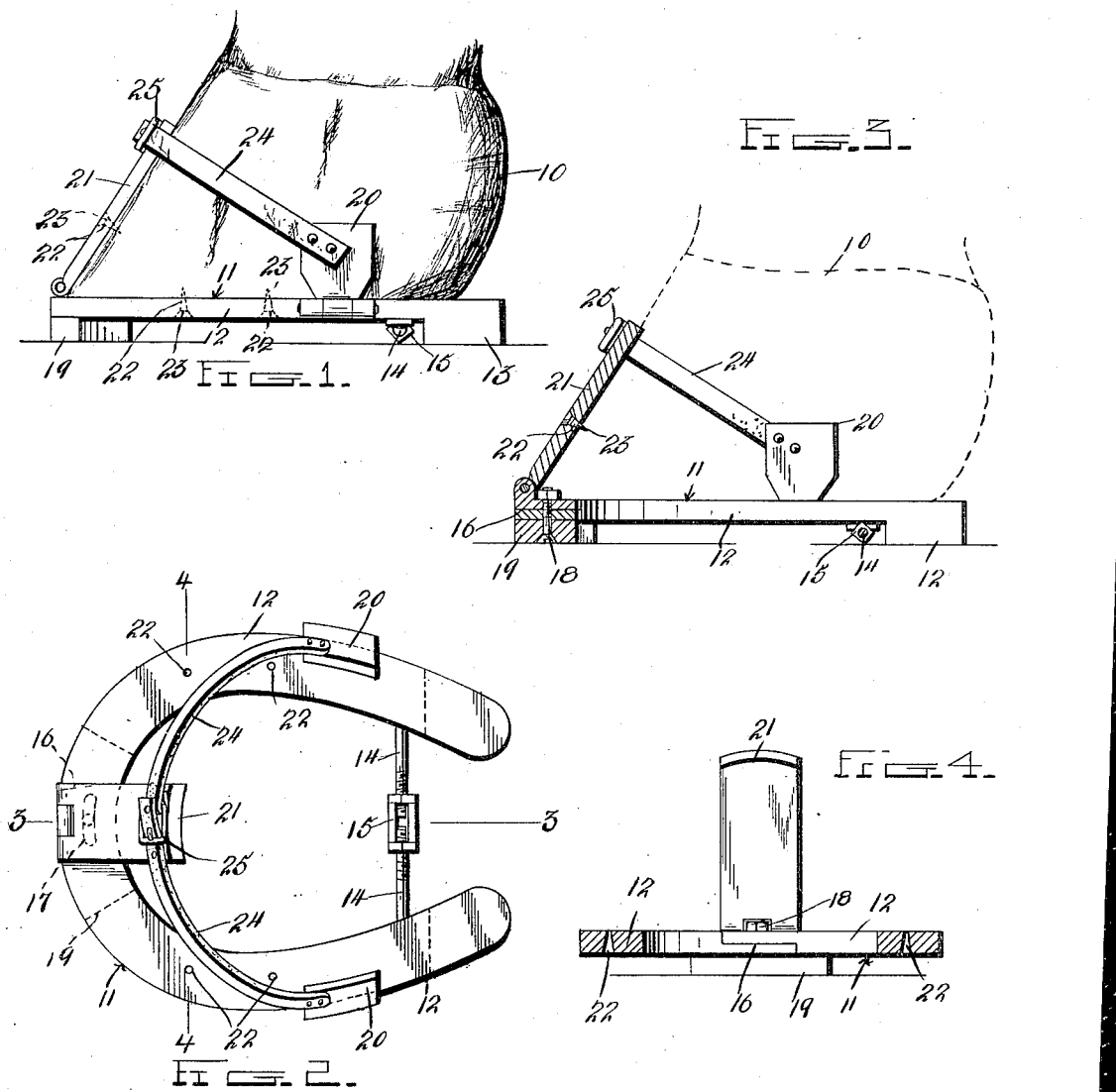
Inventor
R. L. Taylor

UNITED STATES PATENT OFFICE.

RICHARD L. TAYLOR, OF PINE BLUFF, ARKANSAS.

HORSESHOE.

1,024,426.

Specification of Letters Patent. Patented Apr. 23, 1912.

Application filed September 11, 1911. Serial No. 648,598.

*To all whom it may concern:*

Be it known that I, RICHARD L. TAYLOR, a citizen of the United States, residing at Pine Bluff, in the county of Jefferson, State of Arkansas, have invented certain new and useful Improvements in Horseshoes; and I do hereby declare the following to be a full, clear, and exact description of the invention, such as will enable others skilled in the art to which it appertains to make and use the same.

This invention relates to new and useful improvements in horse shoes.

An object of this invention is the provision of a shoe such as described which may be adjusted to fit any sized hoof.

Another object of this invention is the construction of a horse shoe which is provided with novel means of attaching the same to the hoof of an animal.

A further object of this invention is to improve and simplify devices of this character, rendering them comparatively simple and inexpensive to manufacture, reliable and efficient in use and readily operated.

With the above and other objects in view, this invention resides in the novel features of construction, formations, combinations and arrangements of parts to be hereinafter more particularly described, claimed and illustrated in the accompanying drawing, in which:

Figure 1 is a side elevation of my invention applied. Fig. 2 is a top plan view thereof removed. Fig. 3 is a longitudinal sectional view taken on the line 3—3 of Fig. 2, and Fig. 4 is a transverse sectional view taken on the line 4—4 of Fig. 2.

Referring to the drawing by similar characters of reference throughout the several views, the numeral 10 designates a horse's hoof to which is applied my improved horse shoe 11. This horse shoe 11 comprises a pair of segmental sections 12 provided at their rear extremities with the usual rear calks 13. These sections have pivoted to their rear extremities adjacent the calks 13, a pair of rods 14, the inner ends of which are threaded and adjustably connected by a turn buckle 15 which provides a means for regulating the distance between the rear ends of the segmental sections 12. The forward ends of the sections 12 are halved together as at 16 and formed with registering slots 17 for the reception of a clamping bolt 18 which provides a means for the adjustment of the forward ends of the segmental sections 12. A front calk 19 is retained in engagement with the under side of the horse shoe 11 by the clamping bolt 19. Side plates 20 are hinged to the intermediate portions of the sections 12 while a front plate 21 is hinged to the meeting end of one of the sections 12. The sections 12 are each provided with apertures 22 for the reception of screws or other similar fastening devices 23 which are adapted to engage the hoof 10 and prevent the displacement of the shoe 11 therefrom. A strap 24 is secured to each of the plates 20 and is adapted to pass around the hoof to the back thereof at which point these said straps are connected by a buckle 25.

From the foregoing disclosures taken in connection with the accompanying drawing, it will be manifest that a horse shoe of the nature described is provided for which will fulfil all of the necessary requirements of such a device.

Having thus fully described this invention what I claim as new and desire to protect by Letters Patent, is:

A horse shoe such as described comprising a pair of segmental sections, calks upon the rear extremities thereof, a pair of rods hinged to the segmental sections adjacent the calks, a turn buckle connecting the ends of the rods, the meeting ends of the segmental sections having registering openings formed therein, a front calk, a bolt passing through the registering slots and the front calks and connecting the sections and retaining the calk thereon, plates hinged to intermediate portions of the sections, a plate hinged to the meeting end of one of the sections, fastening means passing through the said plates and sections for engagement with the hoof of an animal and traps secured to the side plates for engagement with the hoof.

In testimony whereof, I affix my signature, in presence of two witnesses.

RICHARD L. TAYLOR.

Witnesses:
A. B. KNIGHT,
WM. CLARK.

---

Copies of this patent may be obtained for five cents each, by addressing the "Commissioner of Patents, Washington, D. C."